UNITED STATES PATENT OFFICE.

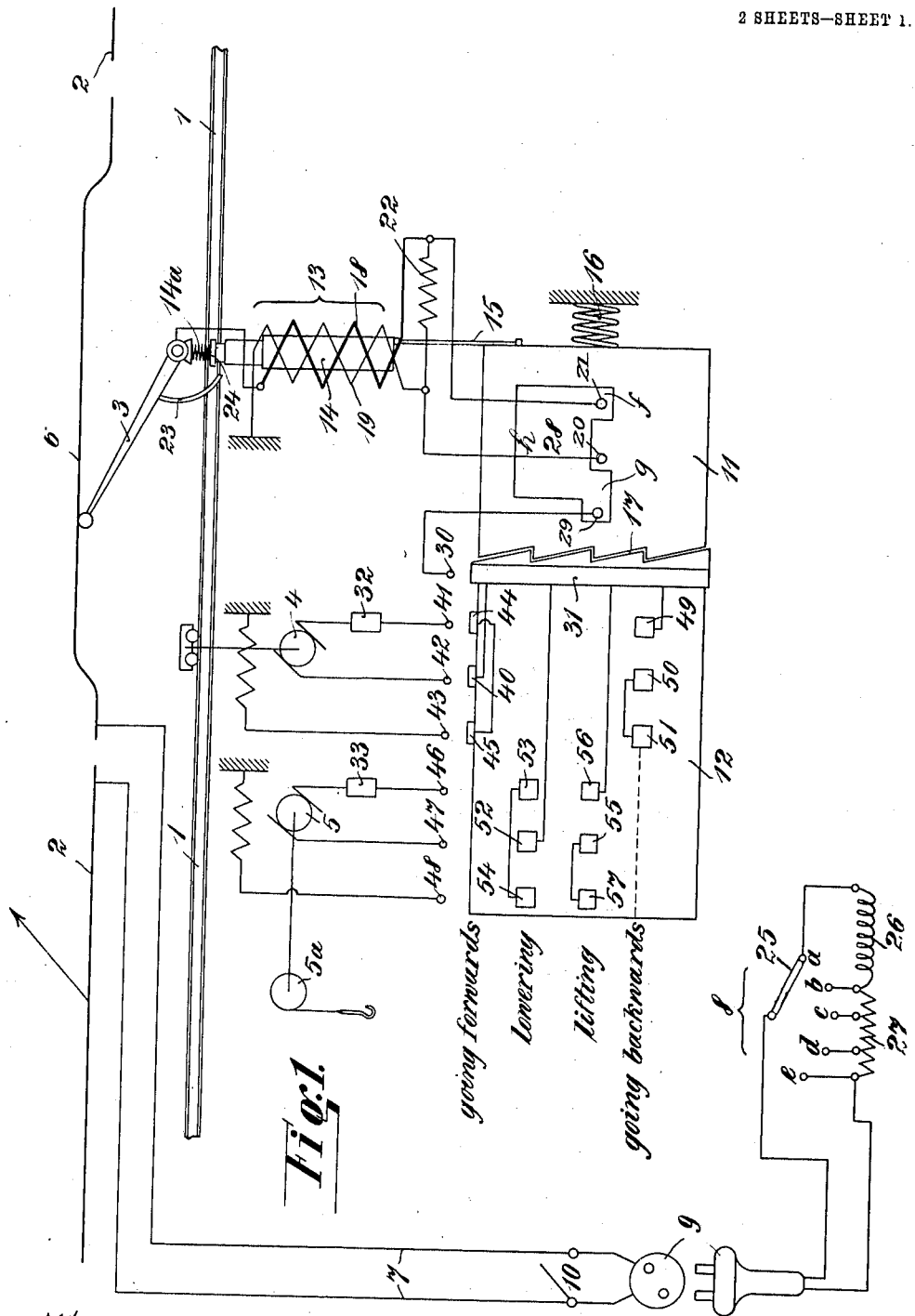

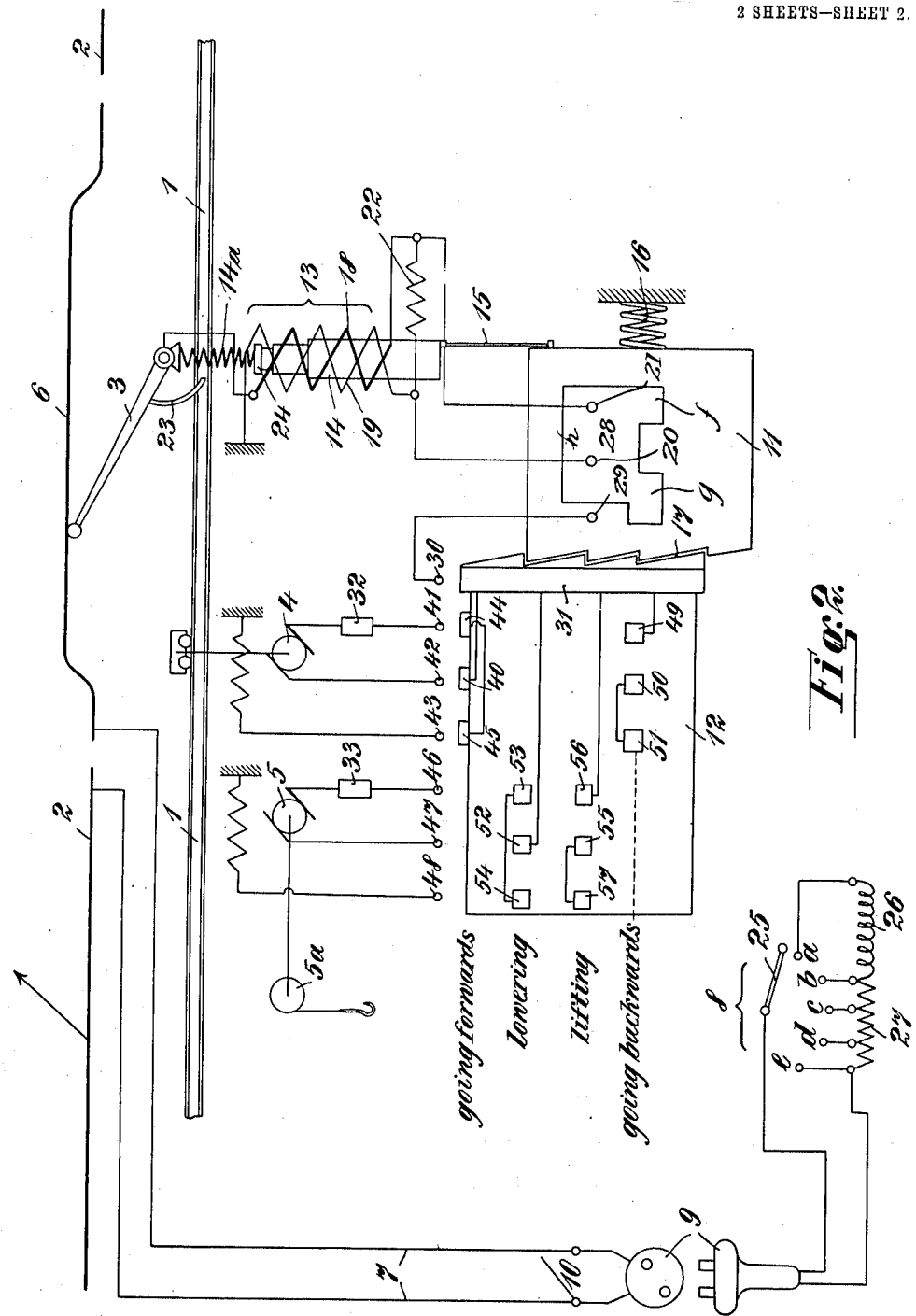

HERMANN GRADENWITZ, WILHELM VOLLBRECHT, AND HANS LEVZOW, OF BERLIN, GERMANY, ASSIGNORS TO THE FIRM OF ELEKTROMOTOREN-WERKE HERMANN GRADENWITZ, OF BERLIN, GERMANY.

SYSTEM FOR CONTROLLING ELECTRIC MOTORS AND THE LIKE FROM A DISTANCE.

1,039,272.  Specification of Letters Patent.  Patented Sept. 24, 1912.

Application filed March 15, 1911. Serial No. 614,692.

*To all whom it may concern:*

Be it known that we, HERMANN GRADENWITZ, WILHELM VOLLBRECHT, and HANS LEVZOW, citizens of the German Empire, and residents of Berlin, Germany, have invented certain new and useful Improvements in Systems for Controlling Electric Motors and the Like from a Distance, of which the following is a specification.

Our invention relates to systems for controlling electric motors and the like from a distance and is intended primarily for telpherage systems.

It has for its immediate object to provide means for controlling from a distance and in optional order a plurality of electric motors such as for instance the driving motor and the hoisting motor of a car or trolley upon overhead track.

The invention is especially adapted for use in telpherage systems wherein a car transfers material from one point to another and having discharged the material is either returned to the starting point or moves on to some other point of the track. The invention, however, is applicable to the traveling of cranes and to any carriage driven by electricity. The invention may be used as well for controlling a plurality of stationary motors or other electric devices from a distance.

We are aware that means for controlling from a distance the driving motor and the hoisting motor of the cars in telpherage systems have been described before. With these older systems however, the control from a distance could be effected only by means of at least one additional current conductor besides the ordinary trolley wire, and the cars had to be provided with two or more current collectors. With the system according to our invention the controlling of the motors is effected exclusively through the ordinary line wire or main current conductor and a single current collector only is required for each car. Our invention therefore involves the greatest simplicity of the system as a whole as well as a material reduction in the costs of construction and maintenance.

In the drawings forming part of this specification we have shown the preferred form of our invention.

Figures 1 and 2 show in diagram the connections for a telpherage system arranged according to our invention, the working parts being shown in two different positions.

In the drawings 1 is the overhead track, 2 the line wire, 3 the trolley, 4 the driving motor, 5 the hoisting motor, 5$^a$ the winch driven by said motor. At those points where it is desired to control the motors, that is to say, where either the driving motor should be stopped and the hoisting motor be started or vice versa, a dead section 6 is insulated from the line wire and an auxiliary circuit 7 is branched off the live and the dead section of the line wire, this branch 7 leading to a starting switch 8 which may be either stationary or may be movable and may be connected to one or the other branch conductor by means of a two pin wall plug 9. A single pole switch 10 is arranged in the branch circuit, said switch serving for connecting to or cutting off from the branch the starting switch 8.

Between the trolley 3 and the motors 4 and 5 there are located on the car a switch drum in two pieces 11, 12 and a solenoid 13. The core 14 of the solenoid is normally, as shown in Fig. 2, under the pressure of a spring 14$^a$ and its lower end is connected to part 11 of the switch drum by means of a connecting rod 15 in such manner that the core in rising against the force of the spring 14$^a$ imparts to the part 11 a short angular movement and upon returning to its initial or normal position turns the part 11 back again.

The member 11 of the switch drum carries the contact for controlling the solenoid; the part 12 carries the contacts for controlling the motors. The two members 11 and 12 of the switch drum are pressed against each other by a spring 16 and are connected by means of a claw coupling 17 in such a manner, that member 11, as the core of the solenoid rises, will engage member 12 and turn it in the same direction, whereas on its return movement member 11 will slide past member 12. The claw coupling has as many steps as there are groups of contacts arranged in one axial line on drum 12, corresponding to as many controlling positions of the switch drum. In the modification shown in the drawings four steps are provided, corresponding to two controlling positions for the driving motor (forward and backward) and two controlling positions for the hoisting motor (lifting and lowering), whereby in Fig. 1 drum 12 has been moved into the "forward" position of the driving motor, and in Fig. 2 drum 11 has returned to normal position and is ready to move drum 12 one step farther from the position shown in Fig. 1.

The solenoid 13 carries two distinct windings, a main winding 18 with a small number of turns and of low resistance, and an auxiliary winding 19 with a great number of turns and having a relatively high resistance. The ends of the two windings 18 and 19 are connected by a resistance 22, in order to prevent, upon the driving or hoisting motor being stopped automatically by means of an automatic safety cut-out 32 or 33 which may be a fuse or any other suitable means, the solenoid 13 from releasing the core 14. Whenever a motor is cut out automatically, the current will flow from trolley 3 through winding 18, resistance 22 and winding 19 of the solenoid to the ground. In order to prevent that in such a case the auxiliary winding carries too much current for any length of time, the resistance 22 is proportioned to make an overloading of auxiliary winding impossible while the intensity of current still suffices to retain the core.

The trolley 3 carries a locking sector 23 adapted to slide below a plate 24 fastened on top of the core 14 of the solenoid, thereby locking the solenoid while the car is traveling along the track and preventing the switch drum to be rotated and the motors to be controlled as long as the car is in motion. At those points where the motors are to be controlled, the line wire is located somewhat higher above the track, so that at these points the trolley arm rises and in turn stop 23 releases the core.

The starting switch 8 consists of a contact lever 25, a series of contact pieces $a$, $b$, $c$, $d$, $e$ and a starting resistance 27 and is moreover provided with a choking resistance 26.

The central part of the contact plate 28 on drum 11 of the controller is narrower than the sides, and the brush 20 connected to auxiliary winding 19 of the solenoid therefore leaves the contact plate before the angular movement of part 11 is completed, while portion $f$ remains in contact with brush 21. At the same time portion $g$ of contact plate 28 comes into contact with a brush 29 so that at the end of the stroke the current passes from contact plate 28 to brush 29 and a brush 30 connected therewith onto the contact ring 31 on part 12 of the switch drum and from this ring through the motor in operation to the ground. Contacts 20, 21 and 29, as shown in Figs. 1 and 2 are assumed to be fixed and located in one straight line above the drum 11, adjacent to its periphery.

The arrangement of parts and connections described above enables the operator to cut in or out and to reverse in optional order a plurality of motors with the aid of a single line wire and a single trolley, no additional current conductor being required. The means which afford these advantages are first of all the choking resistance in the starting switch and the combination of a main winding of low resistance and an auxiliary winding of high resistance in the solenoid, and in second place the use of a divided controller drum, one of the parts serving for the distribution of the controlling current and returning into its initial position, whenever the starting switch lever is moved back, while the other part serves for distributing the controlling current to one or the other motor and is rotated always in one and the same direction.

In order to cause the driving motor to run in the forward direction with the controller in the position shown in Fig. 1 the current coming from a source of electricity is conducted through line wire 2, branch conductor 7, lever 25, contact $e$ of the starting switch, trolley 3, main winding 18 of the solenoid, brush 21, contact plate 28, brushes 29 and 30, contact ring 31, contact piece 40, brush 42, armature of driving motor 4, brush 41, contacts 44 and 45, brush 43 and over the motor field winding onto the track rail or to the ground. It is assumed thereby that by thus energizing solenoid 18 its core 14 is attracted and has oscillated drum 11 to its limit, so that thereby portions $f$ and $g$ of plate 28 are in contact with brushes 21 and 29 respectively, while brush 20 has left the plate as previously described. By throwing contact lever 25 directly onto contact $e$, a sufficiently strong current is admitted to start the motor. In order to reverse the driving motor 4, the current should be reversed in the armature while retaining the same direction in the field winding of the motor. The circuit should therefore be as follows: from ring contact 31 through contact piece 49 and the armature of the driving motor to brush 42 and from there through contact pieces 50 and 51 and brush 43 to the track rail and therefore the controller drum 12 should be revolved a sufficient number of steps from the position shown in Fig. 1 to bring contacts 49, 50, 51 in line with brushes 41, 42, 43. This is accomplished with the aid of choking coil 26 and auxiliary coil 19 as will be presently described. If the hoisting motor is to be started for the lowering of the load, the current must be transferred from the driving motor to the hoisting motor by revolving controller 12 to bring contacts 53, 52, 54 and 46, 47, 48 in line. The contact lever 25 of the starting switch is first of all returned to its neutral position. This opens circuit 7 whereby solenoid 18 is deënergized so that drum 11 under the action of spring 14$^a$ oscillates back to normal position shown in Fig. 2, whereby the portion $h$ of plate 28 connects brushes 20 and 21, while brush 29 is now out of contact with portion $g$. If now lever 25 is turned on to contact $a$, the current will flow from contact lever 25 through the choking resistance 26 and starting resistance 27, trolley 3, winding 18, brush 21, plate 28, brush 20, auxiliary winding 19 to the track rail. This energizes the solenoid and causes the core to rise against the action of spring 14$^a$, drum 11 oscillates and controller 12 will be rotated one step farther into lowering position. Motor 5, however, does not yet start to operate, so long as lever 25 remains on contact $a$, because choking resistance permits only sufficient current to flow for energizing the solenoid in order to oscillate drum 11 into the position shown in Fig. 1. The starting switch lever 25 is then turned past contacts $b$, $c$, $d$ onto contact $e$ and the current now flows through the trolley 3, winding 18, brushes 21 and 29, contact ring 31, contact piece 52, brush 47, armature of hoisting motor 5, brush 46, contact pieces 53 and 54, brush 48 and field winding of the hoisting motor to the track rail. In order to lift the hook the starting switch lever 25 is again returned to its neutral position, so that drum 11 returns to normal position under the action of spring 14$^a$ and the lever is then turned onto contact $a$, so as to again oscillate drum 11 and thereby rotate controller 12 another step into the lifting position. The current then flows through trolley 3, main winding 18, brush 21, contact plate 28, brush 29, contact ring 31, contact piece 56, brush 46, armature of hoisting motor 5, brush 47, contact pieces 55 and 57 and brush 48 and through the field winding of the hoisting motor to the track rail. If it is contemplated for instance to merely reverse the driving motor from the forward direction to the return direction, the switch lever 25 is merely moved back to its neutral position and is then moved three times onto and off contact $a$, thereby rotating the controller drum 12 on the car through the position of lifting and lowering without starting the hoisting motor for the reason described above. Thus, it will be noted, the controller may be rotated step by step into any desired position to effect any desired movement of the apparatus driven by the motors, without any additional trolley wires or the like heretofore necessary to control the several movements of the car.

What we claim and desire to secure by Letters Patent is:

1. In an electrical control system of the character described, the combination of a single line wire, at least one motor, a step by step controller connected to the line wire by which the several operations of the motor are to be controlled, to effect said motor operations, a solenoid energized from said line wire for operating said controller, interposed between the line wire and said controller, and a motor starter in said line wire disposed any desired distance away from said motor having means controlling the current for energizing only said solenoid to operate said controller or also for controlling such operation of said motor for which the circuit has been set by said controller.

2. In an electrical control system of the character described, the combination of a single line wire, at least one motor, a step by step controller connected to the line wire by which the several operations of the motor are to be controlled, to effect said motor operations, a solenoid energized from said line wire for operating said controller, interposed between the line wire and said controller, said solenoid having a low resistance winding adapted to conduct the motor current and a high resistance winding connected in series with said low resistance winding with a suitable resistance interposed to permit only sufficient current to pass through it to retain the solenoid core attracted, means on said controller for short circuiting said resistance when said solenoid is deënergized but for inserting said resistance after the solenoid is energized and the controller is operated one step, and a motor starter in said line wire disposed any desired distance away from said motor having means controlling the current for energizing only said solenoid to operate said controller or also for controlling such operation of said motor for which the circuit has been set by said controller.

3. In an electrical control system of the character described, the combination of a single line wire, at least one motor, a step by step controller connected to the line wire by which the several operations of the motor are to be controlled, said controller having a member provided with suitable contacts for setting the several circuits to effect said motor operations and rotatable in one direction only, said member being provided at one end with an annular ratchet bar faced in one direction, said controller also having an oscillating member in engagement with said ratchet bar to move it step by step in said direction, a solenoid interposed between the line wire and said controller having a spring pressed core connected with said oscillating member for oscillating it when the solenoid is energized to feed said rotatable member one step at each oscillation against the tension of the spring, and a motor starter in said line wire disposed any desired distance away from said motor having means controlling the current for energizing only said solenoid to operate said controller or also for controlling such operation of said motor for which the circuit has been set by said controller.

4. In an electrical control system of the character described, the combination of a single line wire, at least one motor, a step by step controller connected to the line wire by which the several operations of the motor are to be controlled, said controller having a member provided with suitable contacts for setting the several circuits to effect said motor operations and rotatable in one direction only, said member being provided at one end with an annular ratchet bar faced in one direction, said controller also having an oscillating member in engagement with said ratchet bar to move it step by step in said direction, a solenoid interposed between the line wire and said controller having a spring pressed core connected with said oscillating member for oscillating it when the solenoid is energized to feed said rotatable member one step at each oscillation against the tension of the spring, said solenoid having a low resistance winding adapted to conduct the motor current and a high resistance winding connected in series with said low resistance winding, with a suitable resistance interposed to permit only sufficient current to pass through it to retain the solenoid core attracted, said oscillating member of said controller having a contact plate for short circuiting said resistance when the solenoid is deënergized but for inserting said resistance and simultaneously connecting said rotatable controller member to the line wire through said low resistance coil after the solenoid is energized and the oscillating member has operated the rotatable member one step and a motor starter in said line wire disposed any desired distance away from said motor having means controlling the current for energizing only said solenoid to operate said oscillating member or also for controlling such operation of said motor for which the circuit has been set by the operation of said controller.

5. In an electrical control system of the character described, the combination of a single line wire, at least one motor, a step by step controller connected to the line wire, by which the several operations of the motor are to be controlled, a solenoid energized from said line wire for operating said controller interposed between the line wire and said controller, and a motor starter in said line wire disposed any desired distance away from said motor and adapted to carry the motor current, said starter having a motor starting resistance and a choking resistance in series therewith permitting only sufficient current to pass through it to energize said solenoid for step by step operation of said controller to set any desired circuit for said motor and a controlling lever on said starter for cutting off said choking coil to increase the current to operate said motor through the desired circuit which has been set by said controller.

6. In an electrical control system of the character described, the combination of a single line wire, at least one motor, a step by step controller connected to the line wire, by which the several operations of the motor are to be controlled, a plurality of circuits adapted to contain said motor, said controller having a member provided with suitable contacts for setting the several circuits to effect said motor operations and rotatable in one direction only, and also provided at one end with an annular ratchet bar faced in one direction, said controller also having an oscillating member in engagement with said ratchet bar to move it step by step in said direction, a solenoid interposed between the line wire and said controller having a spring pressed core connected with said oscillating member for oscillating it when the solenoid is energized to feed said rotatable member one step at each oscillation against the tension of the spring, said solenoid having a low resistance winding adapted to conduct the motor current and a high resistance winding connected in series with said low resistance winding, with a suitable resistance interposed to permit only sufficient current to pass through it to retain the solenoid core attracted, the oscillating member of said controller having a contact plate for short circuiting said resistance when the solenoid is deënergized but for inserting said resistance and simultaneously connecting said rotatable controller member to the line wire through said low resistance coil after the solenoid is energized and the oscillating member has operated the rotatable member one step, and a motor starter in said line wire disposed any desired distance away from said motor and adapted to carry the motor current, said starter having a motor starting resistance and a choking resistance in series therewith permitting only sufficient current to pass through it to energize said solenoid for step by step operation of said controller to set any desired circuit for said motor and a controlling lever on said starter for cutting off said choking coil to increase the current to operate said motor through the desired circuit which has been set by said controller.

7. A system for remote motor control of suspended electric cars having a plurality of motors for a plurality of operations, an overhead trolley wire for supplying the current to said motors, and a trolley arm on the car coöperating with said wire, said overhead wire having an elevated dead section at such points where the operations of the motors should be varied, which section permits the trolley arm to rise, a hand operated motor starter disposed any desired distance away from such section but connecting the live overhead wire with said dead section, mechanism controlled by said starter for varying the operations of said motors, a locking sector on said arm and a locking plate on said mechanism for locking the mechanism in a position calling for travel of the car in either direction when said trolley arm is depressed upon entering on the live portion of said overhead wire in either direction to maintain said mechanism in set condition corresponding to the traveling of the car in the direction desired without the aid of the said starter.

8. A system for remote motor control of suspended electric cars having a plurality of motors for a plurality of operations, an overhead trolley wire for supplying the current to said motors, and a trolley arm on the car coöperating with said wire, said overhead wire having an elevated dead section at such points where the operations of the motors should be varied, which section permits the trolley arm to rise, a hand operated motor starter disposed any desired distance away from such section but connecting the live overhead wire with said dead section, a solenoid energized by the operation of said starter and mechanism actuated by said solenoid for controlling the circuit to vary the operations of said motors, a locking sector on said arm and a locking plate on the armature of said solenoid for locking said armature in its attracted position when said trolley arm is depressed upon entering onto the lower live portion of said overhead wire in either direction, to maintain said mechanism in set condition corresponding to the travel of the car in the direction desired without the aid of said starter.

9. A remote control system having electrically driven vehicles, carrying a plurality of motors and a controller therefor having operating means responsive to a current smaller than the motor operating current, said system also having a single conductor and a single trolley on said conductor and connections therefrom for conveying the current both for operating the motors and for actuating said controller, and means connected in circuit with said conductor at any desirable place for controlling the motor current and the controller current received from said conductor through the same circuit.

10. A remote control system having electrically driven vehicles, carrying a plurality of motors and a controller therefor having operating means responsive to a current smaller than the motor operating current, said system also having a single conductor and a single trolley on said conductor and connections therefrom for conveying the current both for operating the motors and for actuating said controller, and means connected in circuit with said conductor at any desirable place for controlling the motor current and the controller current received from said conductor through the same circuit and means on said controlling means for varying the strength of current.

In testimony whereof, we affix our signatures in presence of two witnesses.

HERMANN GRADENWITZ.
WILHELM VOLLBRECHT.
HANS LEVZOW.

Witnesses:
HENRY HASPER,
WOLDEMAR HAUPT